B. E. OSBORN.  3 Sheets—Sheet 1.
Combined Seed-Drill, Cultivator, Harrow, &c.
No. 197,225. Patented Nov. 20, 1877.

Attest:  Inventor:
Jno. B. Brooks. Byron E. Osborn,
 by C. A. Snow & Co.
 Attorneys.

N. PETERS, PHOTO-LITHOGRAPHER, WASHINGTON, D. C.

B. E. OSBORN.
Combined Seed-Drill, Cultivator, Harrow, &c.

No. 197,225. Patented Nov. 20, 1877.

Attest:
Inventor:
Byron E. Osborn,
by C. A. Snow & Co.
Attorneys.

B. E. OSBORN.
Combined Seed-Drill, Cultivator, Harrow, &c.
No. 197,225. Patented Nov. 20, 1877.
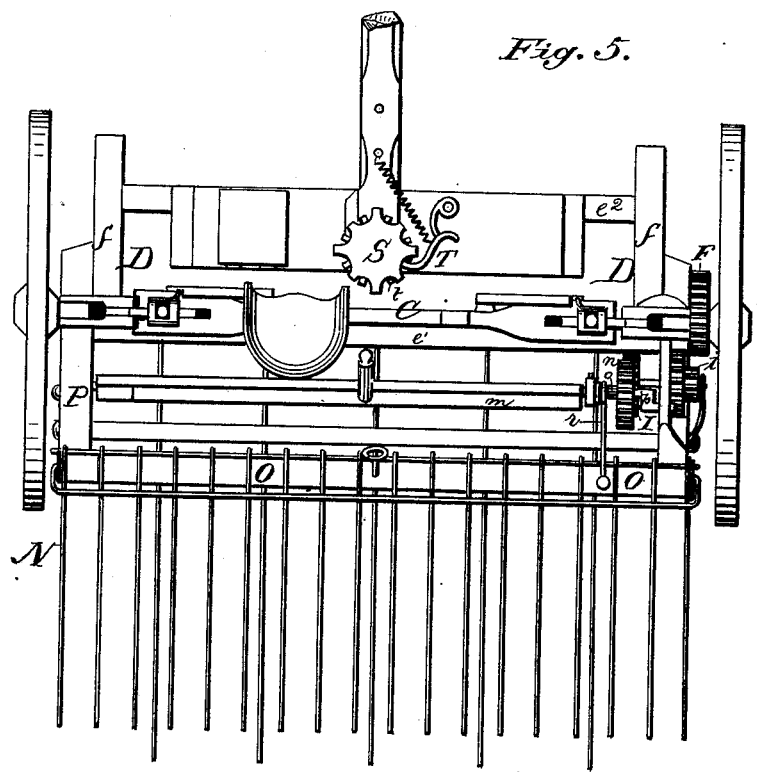
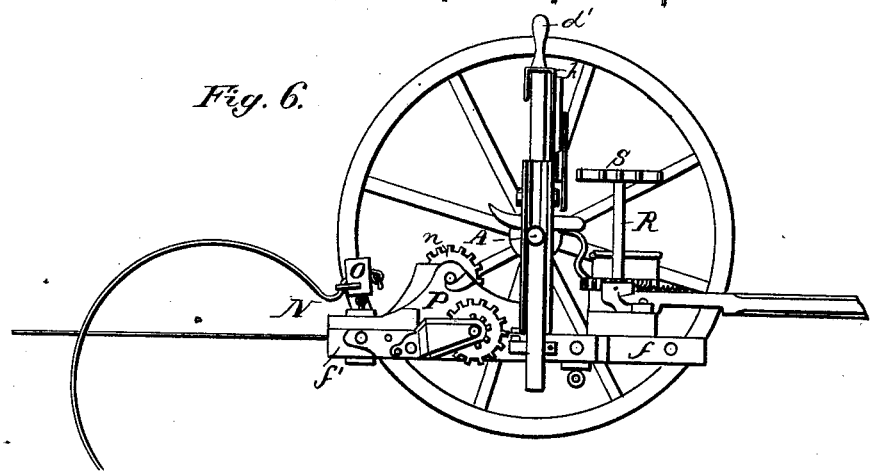

UNITED STATES PATENT OFFICE.

BYRON E. OSBORN, OF THROOPVILLE, NEW YORK.

IMPROVEMENT IN COMBINED SEED-DRILL, CULTIVATOR, HARROW, &c.

Specification forming part of Letters Patent No. 197,225, dated November 20, 1877; application filed January 22, 1877.

*To all whom it may concern:*

Be it known that I, BYRON E. OSBORN, of Throopville, in the county of Cayuga and State of New York, have invented certain new and useful Improvements in Agricultural Implements; and I do hereby declare that the following is a full, clear, and exact description thereof, which will enable others skilled in the art to which it appertains to make and use the same, reference being had to the accompanying drawings, and the letters of reference marked thereon, which form a part of this specification.

My invention consists, essentially, in the construction of a sulky-frame adapted to receive various agricultural implements, such as a harrow, cultivator, hay-rake, seeder, planter, drill, &c., the construction of such implements being such as to adapt them for combination with my said frame, substantially as I shall now proceed more fully to describe with reference to the drawings, in which—

Figure 1:
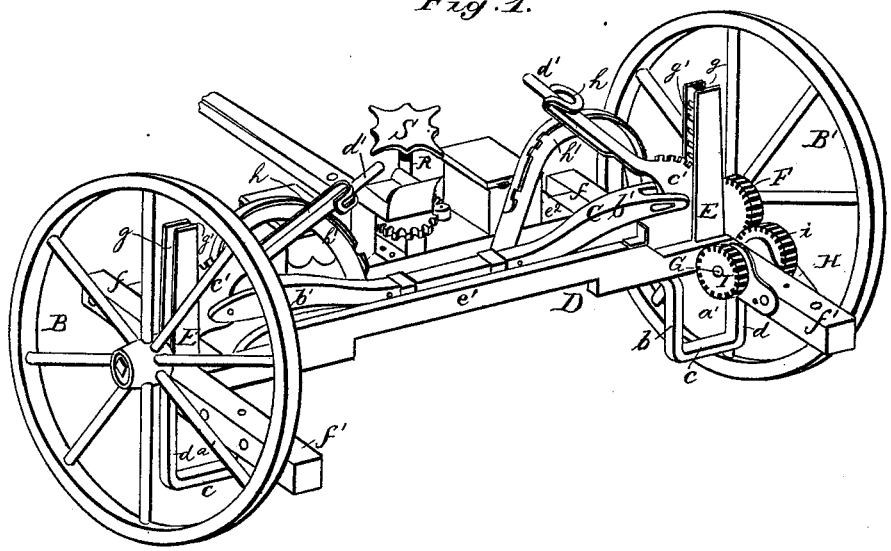
Figure 2:
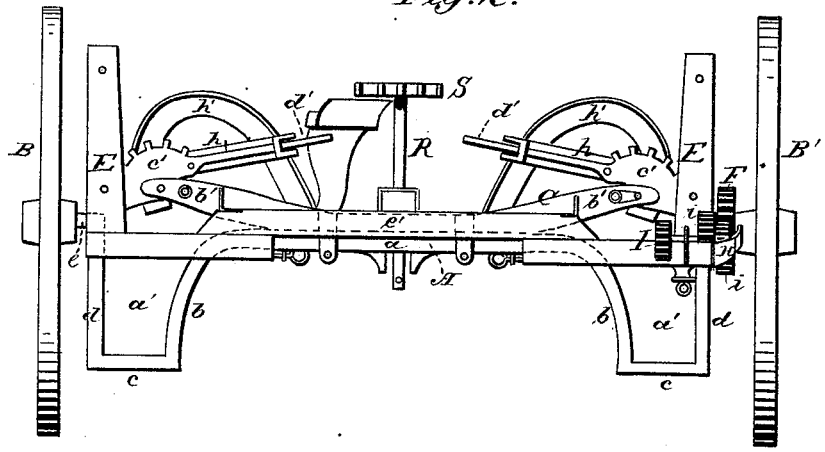
Figure 3:
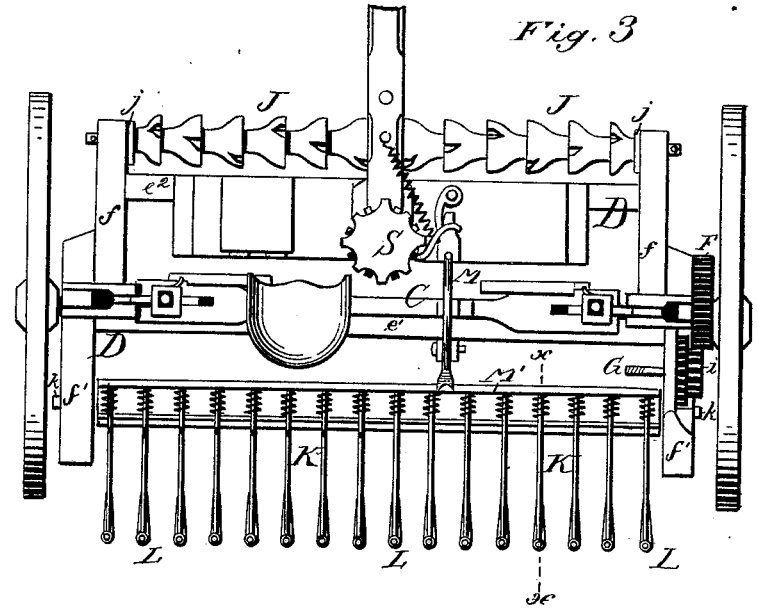
Figure 4:
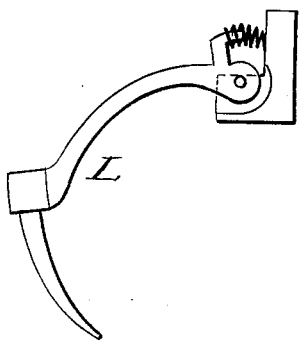

Figure 1 is a perspective view of my improved frame. Fig. 2 is a rear elevation of the same. Fig. 3 is a top view, showing the harrow attachment. Fig. 4 is a section on the line $x\ x$ in Fig. 3. Fig. 5 is a top view, showing the rake attachment; and Fig. 6 is a side view of Fig. 5.

Similar letters of reference indicate corresponding parts in all the figures.

Referring to the drawings, A is the axle of my improved sulky-frame. It is made, preferably, of iron, and consists of a straight central portion or body, $a$, the ends of which are curved downwardly at $b\ b$. The ends of the curves $b\ b$ are bent outward at $c\ c$ in a straight line parallel to body $a$, then upward at $d\ d$ at right angles to $c\ c$, and finally outward, so as to form the spindles $e\ e$ for the wheels B B'. Two downward curves or recesses, $a'\ a'$, are thus formed upon the axle, for the purposes hereinafter set forth.

Secured upon the axle by clips, or in any other suitable way, is a wooden or metallic bar, C, the ends of which are curved upward, so as to form brackets $b'\ b'$, in which are pivoted the segmental ratchet-levers $c'\ c'$, having handles $d'\ d'$ for raising and lowering the frame. The latter, which, as a whole, is denoted by the letter D, consists of two beams, $e^1\ e^2$, one immediately behind and the other some distance in front of the axle, and united by the side pieces $f f$, which are directly above and may slide in the recesses $a'\ a'$ of the axle.

$f'\ f'$ are two beams projecting rearward from the frame, on the sides thereof, and intended for the reception of the various implements which the frame is intended to support.

The devices for and manner of raising and lowering the frame are as follows:

E E are two uprights secured upon the sides of frame D, and having upon the outside recesses or grooves $g\ g$, which clamp the portion $d$ of the axle upon each side. Upon the inside each of the uprights E has a rack, $g'$, with which engages the segment-lever $c'$. The latter may be retained in any desired position by a spring locking device, $h$, engaging with a notched segment, $h'$, attached to the axle at each end thereof. Thus, by operating the lever $c'$, the frame may be easily adjusted at any desired elevation; and, at the same time, it may be pitched more or less to either side, if this should be made necessary by unevenness of the soil.

By the uprights E, which, as before stated, clamp the portions $d$ of the axle, the frame is held very firmly in position for operation, and the side pieces of the frame being confined in the recesses $a'$ of the axle, any lateral movement or "sway" is prevented.

The wheel B' has upon the inside a gear-wheel, F, revolving with it, and engaging with one of a series of differently-sized pinions, $i\ i$, upon a shaft, G, which has its bearings in one of the beams $f'$, projecting rearward from the frame, and in a bracket, H, secured to the side thereof.

The shaft G has upon the inside a detachable pinion, I, which, when not required (as in the case when a harrow or cultivator is used) may be detached, so as not to be in the way. But when, for instance, a hay-rake is the implement which is arranged upon the frame, it is brought into requisition to engage with the machinery of the rake, to effect the periodical elevation of its teeth.

With the exception of a land-roller and pulverizer which, when used, either alone or in combination with a harrow, is hung in brackets depending from and adjustable to the front side of the frame, as shown in Fig. 3, the various implements used in combination with my improved frame are secured upon or between the rearward-extending beams $f'\ f'$ by means of bolts, or in any other suitable manner devised to suit the exigency of each case.

In Fig. 3 I have, for purposes of illustration, shown the roller J and harrow K attached to the frame, the former between brackets $j\ j$ in front, and the latter between the beams $f'\ f'$, it being held in place by bolts $k\ k$ inserted from the sides. L L are the teeth of the harrow, (shown more plainly in the sectional view, Fig. 4,) and M is a lever by which the main bar or body M' of the harrow may be turned, so as to elevate or depress the teeth at option.

In Figs. 5 and 6 I have shown the frame with the rake N attached. The rake-bar O is preferably hinged to the rear ends of brackets P P, attached on top of beams $f'\ f'$. Between the brackets P P is arranged a bar, $m$, having at one end a loose pinion, $n$, with sleeve $o$ and a crank, $p$. The pinion may thus, when the crank-bar $m$ is turned, (by a lever or in any other suitable way,) be made to engage with the detachable pinion I before mentioned, thus causing a cord, $r$, which is secured to the sleeve $o$ and to the rake-bar, to be wound upon the sleeve, thus causing the elevation of the rake-teeth, which, when the pinion is released, descend again by their own weight.

R is an upright shaft, arranged in the front portion of the frame, and having handle S convenient to the driver, and pawl and ratchet T $t$.

When a seed-drill is used this shaft may be connected by a cord with the drill-bar, the elevation of which, with the drills, may thus be controlled, in the usual manner, by the driver.

From the foregoing description the advantages of my invention will readily appear. My improved sulky-frame may be adapted to a variety of uses; it is light, durable, inexpensive, and easily adjusted to suit every emergency.

Having thus described my invention, I claim and desire to secure by Letters Patent of the United States—

1. The axle A, having recesses $a'\ a'$ formed as herein described, in combination with the frame D, provided with uprights E E, having grooves $g\ g$ clamping the portions $d\ d$ of the axle, substantially as described, for the purpose shown and specified.

2. The combination, with the axle A, constructed as herein described, of the bar C, forming brackets $b'\ b'$, ratchet-levers $c'\ c'$, and frame D, provided with uprights E E, the latter having grooves $g\ g$ and racks $g'\ g'$, all constructed, arranged, and operating substantially as described, for the purpose shown and specified.

BYRON E. OSBORN, M. D.

Witnesses:
S. WRIGHT MILK,
J. D. OSTERHOUDT.